United States Patent
Wang et al.

(10) Patent No.: US 10,588,153 B2
(45) Date of Patent: Mar. 10, 2020

(54) SYSTEM AND METHOD FOR RESTRICTING RANDOM ACCESS PROCEDURE-RELATED ACTIVITY IN CONNECTION WITH A BACKGROUND APPLICATION

(71) Applicant: Futurewei Technologies, Inc., Plano, TX (US)

(72) Inventors: Julia Wang, San Diego, CA (US); Limei Wang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 191 days.

(21) Appl. No.: 15/611,649

(22) Filed: Jun. 1, 2017

(65) Prior Publication Data
US 2018/0352580 A1 Dec. 6, 2018

(51) Int. Cl.
| | |
|---|---|
| H04W 52/02 | (2009.01) |
| H04W 74/08 | (2009.01) |
| H04W 76/10 | (2018.01) |
| H04W 4/60 | (2018.01) |
| H04W 76/18 | (2018.01) |
| H04W 4/00 | (2018.01) |

(52) U.S. Cl.
CPC ........ *H04W 74/0833* (2013.01); *H04W 4/60* (2018.02); *H04W 76/10* (2018.02); *H04W 76/18* (2018.02); *H04W 4/00* (2013.01)

(58) Field of Classification Search
CPC ... H04W 74/0833; H04W 4/60; H04W 76/10; H04W 52/02
See application file for complete search history.

(56) References Cited

U.S. PATENT DOCUMENTS

| | | | |
|---|---|---|---|
| 8,693,448 B2 * | 4/2014 | Vujcic | H04W 74/0833 370/337 |
| 9,414,298 B1 * | 8/2016 | Pasupuleti | H04W 48/02 |
| 2010/0296467 A1 * | 11/2010 | Pelletier | H04W 74/002 370/329 |
| 2013/0083713 A1 | 4/2013 | Johansson et al. | |

(Continued)

FOREIGN PATENT DOCUMENTS

WO 2013138983 A1 9/2013

OTHER PUBLICATIONS

International Search Report issued in International Application No. PCT/CN2018/087735 dated Jun. 22, 2018, 9 pages.

(Continued)

*Primary Examiner* — Lan-Huong Truong
(74) *Attorney, Agent, or Firm* — Fish & Richardson P.C.

(57) ABSTRACT

A processing device and associated method are provided for receiving a connection request from an application running as a background process on a wireless communication device, and determining whether one or more random access procedure criteria of a random access procedure is met. The random access procedure establishes a communication connection of the wireless communication device for the connection request. In response to the determination that the one or more random access procedure criteria is met, at least one aspect of the random access procedure is restricted, utilizing one or more processors. Further, the random access procedure is performed with a restriction of the at least one aspect to establish the communication connection for the connection request.

25 Claims, 9 Drawing Sheets

(56) References Cited

U.S. PATENT DOCUMENTS

| | | | |
|---|---|---|---|
| 2013/0115990 A1 | 5/2013 | Koc et al. | |
| 2013/0208647 A1* | 8/2013 | Kottkamp | H04W 74/08 |
| | | | 370/312 |
| 2013/0242735 A1* | 9/2013 | Koc | H04W 72/0413 |
| | | | 370/232 |
| 2013/0265866 A1* | 10/2013 | Yi | H04W 74/0841 |
| | | | 370/216 |
| 2014/0029424 A1 | 1/2014 | Callard et al. | |
| 2014/0098740 A1 | 4/2014 | Xing et al. | |
| 2014/0161111 A1* | 6/2014 | Kim | H04W 56/0005 |
| | | | 370/336 |
| 2018/0324641 A1* | 11/2018 | Tsai | H04L 69/321 |

OTHER PUBLICATIONS wikipedia.org' [online], "Nationwide Wireless Priority Service," available on or before Aug. 22, 2016, [retrieved Aug. 10, 2018], retrieved from URL <https://en.wikipedia.org/wiki/Nationwide_Wireless_Priority_Service>, 2 pages.

Jian et al., "A Novel Class-Dependent Back-off Scheme for Machine Type Communication in LTE Systems," presented at the 2013 22nd Wireless and Optical Communication Conference, IEEE May 16-18, 2013, 6 pages.

3GPP, "3GPP TS 22.011 V6.4.0 (Jun. 2004), 3rd Generation Partnership Project; Technical Specification Group Services and System Aspects; Service accessibility, (Release 6)," 3GPP TS 22.011, Jun. 2004, 16 pages.

Jian et al. "A novel class-dependent back-off scheme for machine type communication in lte systems," Wireless and Optical Communication Conference (WOCC), 2013, IEEE, pp. 1-6.

* cited by examiner

SYSTEM AND METHOD FOR RESTRICTING RANDOM ACCESS PROCEDURE-RELATED ACTIVITY IN CONNECTION WITH A BACKGROUND APPLICATION

FIELD OF THE INVENTION

The present disclosure relates to wireless devices, and more particularly to connecting wireless devices to a network.

BACKGROUND

Random access requests are requests made by a wireless device for access to a network via one or more base stations. Such random access requests can result from connection requests made under the real-time control of the user via a foreground process (e.g. by placing a call, browsing a network, etc.), or made by an application running as a background process. Often, such background process-related connection requests may compete (for network resources) with foreground process-related connection requests, which can degrade a user experience in connection with foreground process-related activity.

SUMMARY

A processing device is provided including a non-transitory memory storing instructions, and one or more processors in communication with the non-transitory memory. The one or more processors execute the instructions to receive a connection request from an application running as a background process on a wireless communication device, and determine whether one or more random access procedure criteria of a random access procedure is met. The random access procedure establishes a communication connection of the wireless communication device for the connection request. In response to the determination that the one or more random access procedure criteria is met, at least one aspect of the random access procedure is restricted, utilizing one or more processors. Further, the random access procedure is performed with a restriction of the at least one aspect to establish the communication connection for the connection request.

Also provided is a method including receiving a connection request from an application running as a background process on a wireless communication device, and determining whether one or more random access procedure criteria of a random access procedure is met. The random access procedure establishes a communication connection of the wireless communication device for the connection request. In response to the determination that the one or more random access procedure criteria is met, at least one aspect of the random access procedure is restricted, utilizing one or more processors. Further, the random access procedure is performed with a restriction of the at least one aspect to establish the communication connection for the connection request.

A computer program product is also provided comprising computer executable instructions stored on a non-transitory computer readable medium that when executed by a processor instruct the processor to receive a connection request from an application running as a background process on a wireless communication device, and determine whether one or more random access procedure criteria of a random access procedure is met. The random access procedure establishes a communication connection of the wireless communication device for the connection request. In response to the determination that the one or more random access procedure criteria is met, at least one aspect of the random access procedure is restricted, utilizing one or more processors. Further, the random access procedure is performed with a restriction of the at least one aspect to establish the communication connection for the connection request.

Optionally, in any of the preceding embodiments, the one or more random access procedure criteria may involve a failed random access preamble transmission threshold number, and the determination as to whether the one or more random access procedure criteria is met may include comparing a number of failed random access preamble transmissions to the failed random access preamble transmission threshold number.

Optionally, in any of the preceding embodiments, the one or more random access procedure criteria may involve a random access procedure message collision threshold number, and the determination as to whether the one or more random access procedure criteria is met may include comparing a number of random access procedure message collisions to the random access procedure message collision threshold number.

Optionally, in any of the preceding embodiments, the at least one aspect of the random access procedure that is restricted may include a transmission of one or more random access attempt requests. As an option, the at least one aspect of the random access procedure that is restricted may include a time between the transmission of a plurality of the random access attempt requests. As another option, the at least one aspect of the random access procedure that is restricted may include a number of the random access attempt requests that are transmitted.

Optionally, in any of the preceding embodiments, the at least one aspect of the random access procedure that is restricted may include one or more subsequent connection requests. As a further option, the at least one aspect of the random access procedure may be restricted by throttling the one or more subsequent connection requests.

Optionally, in any of the preceding embodiments, the at least one aspect of the random access procedure may be restricted by increasing a back off parameter value.

Optionally, in any of the preceding embodiments, the at least one aspect of the random access procedure may be restricted utilizing a timer that restricts the at least one aspect of the random access procedure.

Optionally, in any of the preceding embodiments, the at least one aspect of the random access procedure may be restricted by the wireless communication device, by the one or more random access procedure criteria being configured by the wireless communication device.

Optionally, in any of the preceding embodiments, the at least one aspect of the random access procedure may be restricted by a network, by the one or more random access procedure criteria being received at the wireless communication device from a base station of the network.

DETAILED DESCRIPTION

Figure 1:
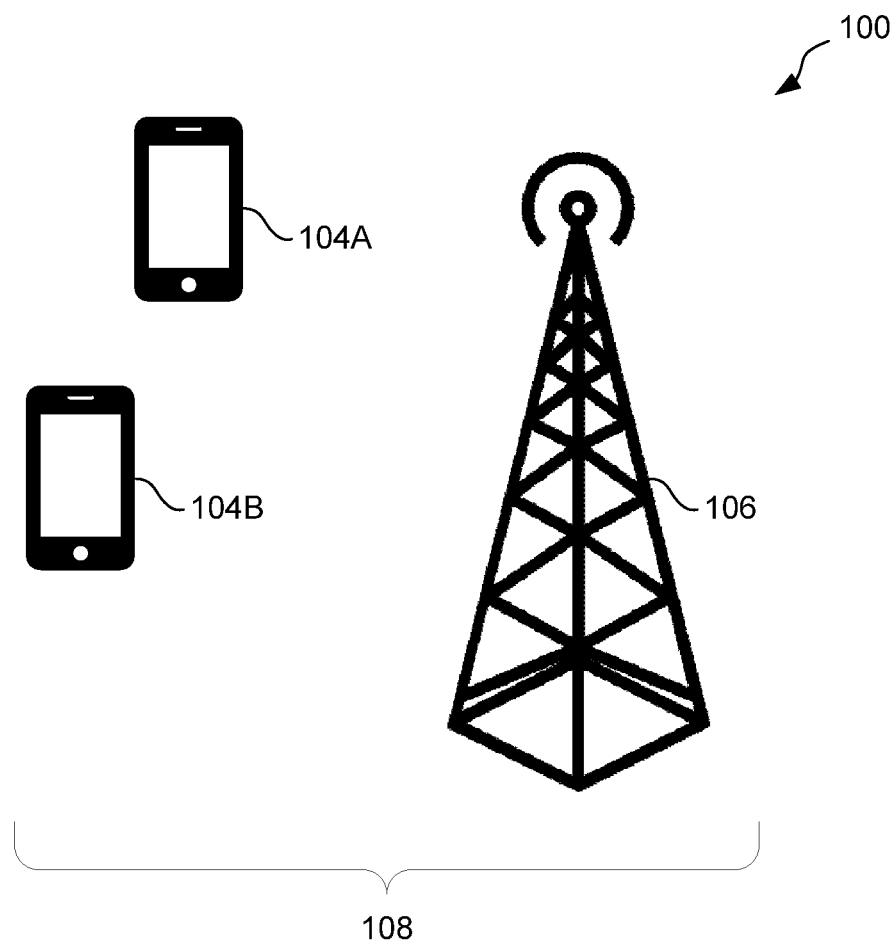
FIG. 1 illustrates a system for restricting a random access procedure that originates from an application running in the background on a wireless communication device, in accordance with one embodiment.

FIG. 1 illustrates a system 100 for restricting a random access procedure that originates from an application running in the background on a wireless communication device 104A, in accordance with one embodiment. As shown, the wireless communication device 104A is in communication with a base station 106 which, together, form a telecommunication network 108. Such network 108 may further include at least one other wireless communication device 104B, as shown.

Non-limiting examples of the foregoing base station 106 may include a Node B, multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), a cell node, and/or any other apparatus that is configured for communicating with the wireless communication device 104A over the telecommunication network 108. Further, the wireless communication device 104A (or simply "wireless device") may, in various embodiments, include a phone, a tablet, a laptop, a vehicle, any desired type of user equipment (UE), and/or any other type of device capable of communicating on the aforementioned telecommunication network 108 or any other type of network, for that matter.

Still yet, in various embodiments, the telecommunication network 108 may include any network including, but not limited to a 3G network, a 4G network, a 5G network, a long term evolution (LTE) or LTE-Advanced network, or any advanced permutation thereof. It should be noted, however, that use of other radio access technology (RAT) networks (e.g. BLUETOOTH, WiFi, etc.) are contemplated, as well.

In use, the wireless devices 104A, 104B (and others not shown) may each attempt to connect the base station 106 by sending a random access request thereto. The purpose of such random access request is for the wireless devices 104A, 104B to gain access to resources of the telecommunication network 108 via the base station 106, so that communication (e.g. transmissions, reception) may ensue with other devices (e.g. other wireless devices, data servers, etc.). In various embodiments, such random access request may take any format and/or follow any protocol, an example of which will be set forth during the description of an embodiment illustrated in FIG. 2B.

It should be noted that the aforementioned random access requests may be initiated by the wireless devices 104A, 104B in different ways. For example, the random access requests may be caused or otherwise prompted by a connection request that is initiated in response to a user of a particular wireless device manually initiating a call by entering a phone number via a phone application. As yet another example, the foregoing connection request may be initiated in response to the user of the particular wireless device manually executing or otherwise controlling an application. For instance, such user may open a network browser and, by manipulating controls of the network browser, the wireless device may initiate a request for or transmission of data which, in turn, requires the initiation of the aforementioned connection request and resulting random access request. Of course, use of other applications are contemplated including, but not limited to office productivity applications, gaming applications, social network applications, etc. In each of the foregoing examples, the application (e.g. the phone application, network browser, etc.) runs as foreground process.

As yet another example of how a connection request may be initiated, an application may initiate such connection request while running as a background process. For instance, an electronical mail (e-mail) application may periodically require a download of any incoming messages from a corresponding data server. Further, this may occur while the particular wireless device is being used by the user to access and/or interact with another application (in the foreground), or while the particular wireless device is not being actively used by the user at all (e.g. while in standby mode, when the screen or other user input/output is deactivated, etc.).

Thus, in the context of the present description, such background process may refer to any process that is capable of being carried out by a wireless device without real-time user intervention. In contrast, the aforementioned foreground process may refer to any process that that is carried out by a wireless device in immediate response to real-time user input.

Given the foregoing different ways that connection requests and resulting random access requests may be initiated by the wireless devices 104A, 104B, situations may arise where the telecommunication network 108 is incapable of serving all random access requests. This is particularly the case where a number of the wireless devices 104A, 104B is large or otherwise exceeds a capability of the base station 106. While such situation may impact all of the aforementioned random access requests (and whether they can be serviced), connection requests resulting from foreground processes (e.g. active user calls, real-time user data requests, etc.) may be most perceptible to users, since the user is actively interacting and requesting service from such processes.

In such situations, the system 100 is capable of handling background process-related connection requests differently as compared to foreground process-related connection requests. Specifically, a connection request-prompted random access preamble transmission may be restricted in any desired manner including, but not limited to delaying such random access preamble transmission, reducing a frequency of such preamble transmission, reducing a number of such preamble transmissions, delaying the aforementioned background process-related connection request, etc. By this design, an overall number of random access preamble transmissions may be reduced during a given time. More information regarding such techniques will be set forth during the description of subsequent embodiments. In any case, the base station 106 is more likely to sufficiently service the foreground process-related connection requests, in order to reduce a likelihood of (or even eliminate) any perceptible reduction in service.

Figure 2A:
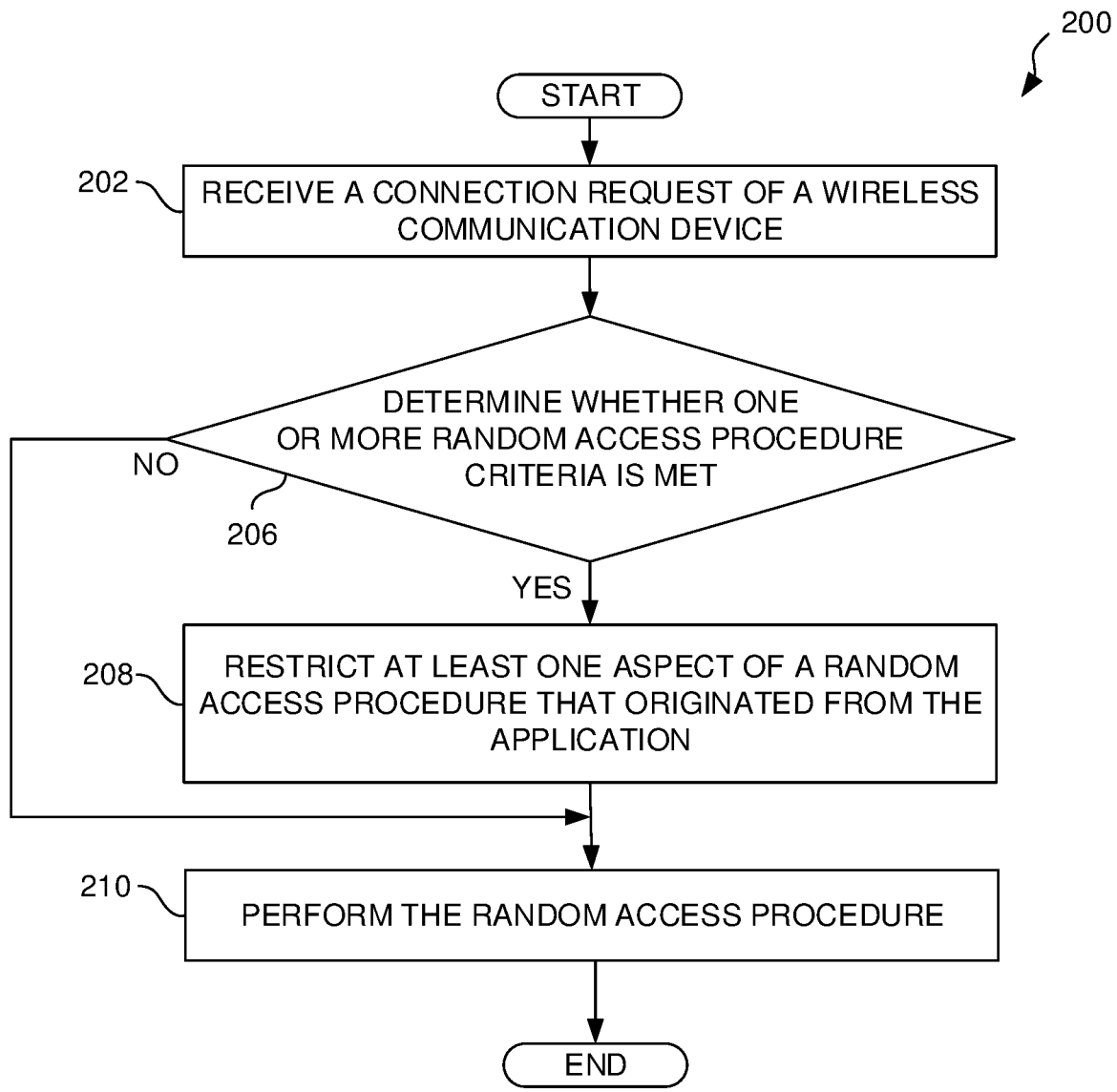
FIG. 2A illustrates a method for restricting a random access procedure that originates from an application running in the background on a wireless communication device, in accordance with an embodiment.

FIG. 2A illustrates a method 200 for restricting a random access procedure that originates from an application running in the background (by virtue of the application initiating a connection request), in accordance with an embodiment. As an option, the method 200 may be implemented in the context of any one or more of the embodiments set forth in any previous and/or subsequent figure(s) and/or the description thereof. For example, the method 200 may be carried out by the wireless devices 104A, 104B of FIG. 1. However, it is to be appreciated that the method 200 may be implemented in other suitable environments.

As shown, in operation 202, a connection request from an application running as a background process on a wireless device (e.g. wireless devices 104A, 104B of FIG. 1, etc.) is received. In the context of the present description, such connection request may refer to any command, instruction, inter-process communication (IPC), or any other signal that results in (or even includes) a connection request radio frequency (RF) signal being transmitted from the wireless device.

For example, in use in accordance with one embodiment, after the wireless device receives a connection request from an upper layer application, the device may select a random access preamble, and transmit such random access preamble to the base station (e.g. base station 106 of FIG. 1, etc.) to start a random access procedure whose purpose is to create an active connection between the wireless device and a base station (e.g. the base station 106 of FIG. 1). It should be noted that the aforementioned random access preamble may include any random access resource and may also be referred to as a random access request. More information regarding such random access preamble/request and the corresponding random access procedure will be set forth during the description of FIG. 2B. Still yet, in addition to the aforementioned connection request (and any following random access procedure) directly originating from an application installed on a wireless device, the aforementioned connection request (and any following random access procedure) may, in other embodiments, indirectly originate from the application as a result of actions by a user of the wireless device, and/or any other hardware and/or software of the wireless device in connection with the application.

As an option, it may be determined whether the connection request originated from the application running as the background process on the wireless device. Such determination may be carried out in any desired manner. For example, the method 200 may, in one possible embodiment, access a data structure that maintains a list of all applications currently running in the background, in order to discern whether the connection request originated from an application on such list. In other possible embodiments, a check may be performed to discern whether the connection request originated as a result of real-time user input or in connection with other indicia of foreground processes (e.g. graphics processor usage, etc.) and, if so, conclude that the application is not running as a background process.

Assuming that a random access procedure is/remains unsuccessful, it is then determined, in decision 206, whether one or more random access procedure criteria (hereinafter "criteria") is met. In a first optional embodiment, such one or more criteria may involve a failed random access preamble transmission threshold number, and the determination as to whether the one or more criteria is met (per decision 206) may include comparing a number of failed random access preamble transmissions to such threshold number. In the context of the present description, the random access procedure may include any process of exchanging one or more signals for the purpose of establishing a communication connection between the wireless device and a network. Further, a failed random access procedure may, in one possible embodiment, refer to a situation where a random access request is transmitted by the wireless device, but a random access response is not received for a predetermined amount of time.

In a second optional embodiment (that may be used as a substitute for or supplement the first optional embodiment), the one or more criteria may involve a threshold number of random access procedure message collisions, and the determination as to whether the one or more criteria is met (per decision 206) may include comparing a number of random access procedure message collisions to the threshold number. In the present description, a random access procedure message collision may refer to a situation where any connection request-prompted signaling message is transmitted by the wireless device, but a response to such connection request-prompted signaling message is not received for a predetermined amount of time. In various embodiments, the aforementioned signaling message may include a random access preamble or subsequent signaling message such as a scheduled transmission [e.g. radio resource control (RRC) connection request], and the response may include a random access response and/or a contention resolution message. More information regarding such signaling messages and responses will be set forth during the description of FIG. 2B.

To this end, the second optional embodiment may take into account more messages than the first optional embodiment, when determining whether the one or more criteria is met per decision 206. Further, it should be noted that the aforementioned thresholds may be statically predetermined or dynamically determined in any desired manner by the wireless device and/or base station (or other network component) via direct or broadcast signaling.

It should be noted that, in various embodiments, the aforementioned thresholds may be triggered for a variety of reasons. For example, a preamble (or other subsequent message) may be transmitted from a particular wireless device at a same time/frequency resource as another wireless device, resulting in the base station receiving a garbled signal that results from message interference. In another embodiment where preambles are randomly selected by wireless devices, a situation may arise where two different wireless devices randomly select the same preamble by coincidence. In such situation, the base station may respond to only one of such wireless devices (or neither).

In response to the determination that the one or more criteria is met, at least one aspect of a random access procedure resulting from the connection request that originates from the application running in the background on the wireless device, is restricted. See operation 208. In the context of the present description, such aspect(s) may refer to one or more messages of the random access procedure itself (e.g. their contents, format, etc.), or a manner (e.g. time, frequency, etc.) in which such message(s) are transmitted or otherwise processed. Further, restriction of such aspect(s) may be accomplished, in various embodiments, by controlling the random access procedure-related messages themselves and/or any signaling (e.g. connection requests, etc.) that causes or otherwise prompts initiation of the random access procedure.

With continuing reference to FIG. 2A, the random access procedure may be performed in operation 210 to establish the communication connection for the connection request. Further, to the extent that operation 208 is performed prior, the random access procedure is performed with a restriction of the at least one aspect. In the context of the present description, the aforementioned restriction may refer to any act or omission that results in less random access attempts being in the need of servicing at least for a given point in time (e.g. real-time, during a time period, etc.). Still yet, the random access procedure aspect(s) may involve the above-mentioned connection request (received in operation 202), and/or subsequent random access procedures (or related messages), in so far as the random access procedure indirectly originates from the background application (by virtue of the background application generating the connection request that initiates the random access procedure). In various embodiments, the foregoing restriction may correspond to a limit of one or more capabilities or features of the random access procedure (e.g. based on changes or updates in configurations or settings of such random access procedure).

For instance, in one possible embodiment where the aforementioned aspect(s) includes a transmission of random access attempt requests, the aspect(s) (that is/are restricted) may include a time between the transmission of a plurality of random access attempt requests. Just by way of example, a time between random access attempt requests may be augmented, so that fewer of such random access attempt requests occur at a given time (or time period). In another embodiment, the aspect(s) may include a number of the random access attempt requests that are transmitted. For example, the number of such random access attempt request transmissions may be reduced, so that fewer of such random access attempt requests occur at a given time (or time period).

In another embodiment where the aforementioned aspect(s) includes one or more subsequent connection requests, the aspect(s) of the random access procedure may be restricted by throttling the one or more subsequent connection requests. For example, a number or frequency of the subsequent connection requests may be reduced which, in turn, results in fewer or delayed random access procedures since it is the connection request(s) that prompts initiation of the corresponding random access procedure.

Further, it should be noted that the foregoing aspect(s) may be restricted using any desired mechanism. For instance, the aspect(s) may be restricted utilizing an increased back off parameter value. In the context of the present description, such back off parameter value refers to a parameter assigned to wireless devices that dictate a priority with which the wireless device is serviced. For instance, a lower back off parameter value may result in higher priority servicing (e.g. the aspect(s) may not be restricted in the manner set forth earlier). Further, increasing the back off parameter value may result in a higher back off parameter value which, in turn, may result in lower priority servicing (e.g. the aspect(s) may be restricted in the manner set forth earlier).

In normal operation (e.g. when decisions 204 or 206 are answered in the negative) and an access attempt fails, the device waits a random back off time prior to starting the random access procedure again. Such back off time is randomly generated according to a uniform distribution between 0 and a back off parameter value. By this design, there is a random distribution of priorities amongst devices. However, when the restriction of operation 208 occurs, the back off parameter may be purposefully selected to be a higher number, resulting in any of the aforementioned restrictions of any of the aforementioned aspects.

In still another embodiment, the aforementioned aspect(s) may be restricted utilizing a timer. For example, in one possible embodiment, such timer may dictate a duration of time before which a wireless device may attempt a reconnection by initiating a random access attempt (and associated request). This may be accomplished, for example, by restricting when the background application may be allowed to cause a connection request. Specifically, when the restriction of operation 208 occurs, the timer may be augmented (in connection with one or more background process-related applications) so as to restrict the background application from originating a connection request before the timer expires which, in turn, prevents random access attempt requests from occurring before the timer expires. Further, similar to the setting of the aforementioned threshold, etc.; the aspect(s) of the one or more random access attempt procedure may be restricted by the wireless device (by the one or more criteria being configured by the wireless communication device), by a network to which the wireless device is connected (by the one or more criteria being received at the wireless communication device from a base station of the network), or both.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the other features described.

Figure 2B:
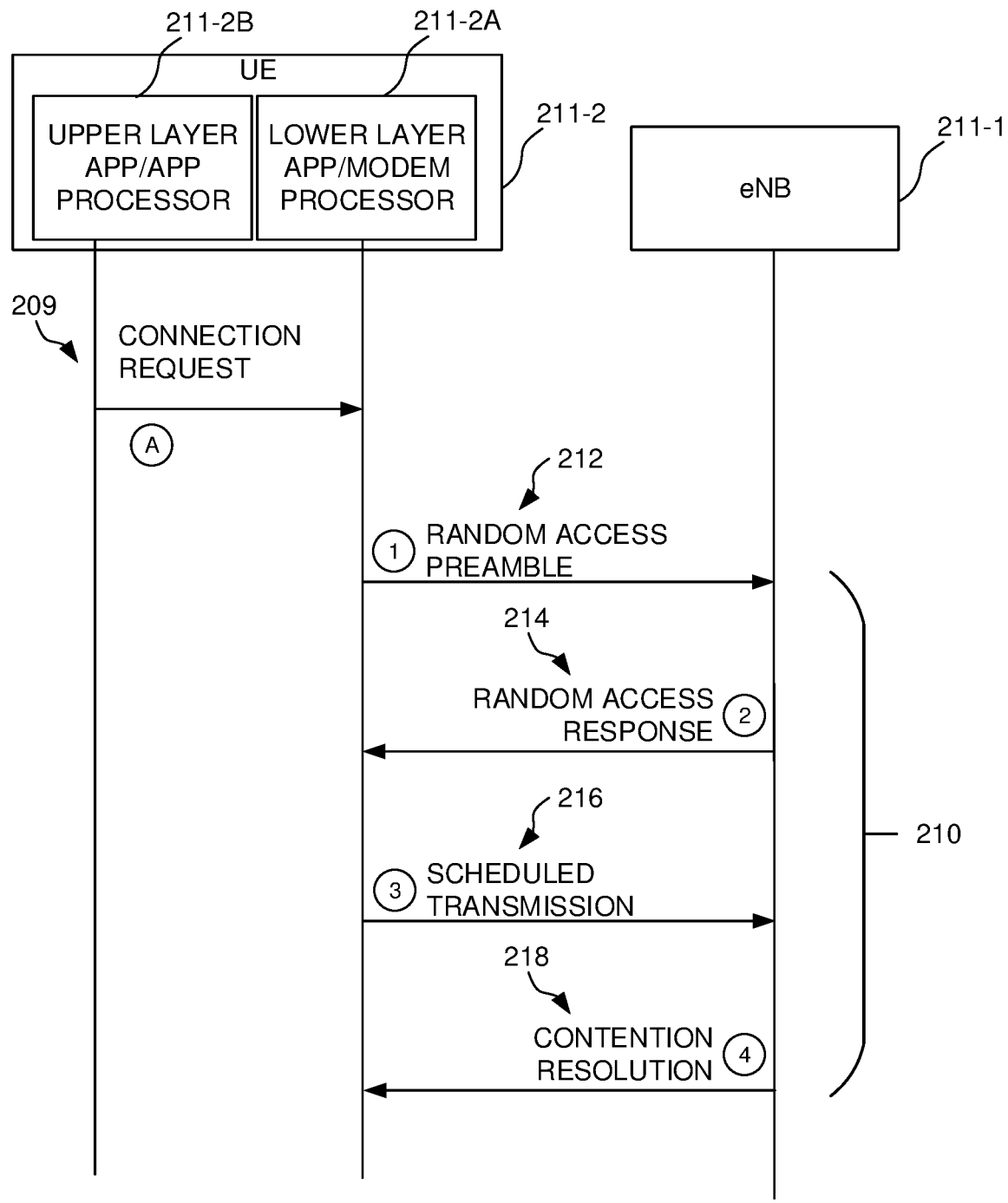
FIG. 2B illustrates a sample random access attempt protocol, in accordance with one embodiment.

FIG. 2B illustrates a sample random access procedure 210, in accordance with one embodiment. As an option, the random access procedure 210 may be implemented in the context of any one or more of the embodiments set forth in any previous and/or subsequent figure(s) and/or the description thereof. For example, the random access procedure 210 may be carried out in the context of the network 108 of FIG. 1 and may be carried out in accordance with an LTE or LTE-A standard communication protocol. However, it is to be appreciated that the random access procedure 210 may be implemented in other suitable environments.

The sample random access procedure 210 reflects a contention-based random access procedure between a base station 211-1 (e.g. the base station 106 of FIG. 1) and a wireless device 211-2 (e.g. the wireless devices 104A, 104B of FIG. 1), where the wireless device 211-2 transitions from an idle state to a RRC connected state, etc., as opposed to a contention free random access which might occur at a handover. When the wireless device 211-2 transitions from the idle state to the RRC connected state, a network is unable to dictate which preamble (out of 64 (or less) possible values) should be used. Thus, the wireless device 211-2 uses one of the possible preambles that is randomly selected. As mentioned earlier, such protocol opens up the possibility of a collision if the same preamble is being used by two devices.

As shown in FIG. 2B, the random access procedure 210 is carried out between the base station 211-1 and the wireless device 211-2, where the wireless device 211-2 includes a lower layer application and/or modem processor 211-2A

[e.g. transport/network/data-link/physical-International Standards Organization (ISO) layer application/processor], and an upper layer application and/or application processor 211-2B (e.g. application/presentation/session-ISO layer application/processor). Further, the random access procedure 210 is prompted by a connection request by being sent by the upper layer application 211-2B to the lower layer application/modem processor 211-2A, as indicated in operation A.

Once initiated by operation A, the random access procedure 210 starts with the wireless device 211-2 sending a random access preamble 212 in connection with a LTE Random Access Request. See operation 1. The base station 211-1 then sends (and the wireless device 211-2 receives) a LTE Random Access Response 214 in response to the random access preamble 212, assuming there is no collision or preamble failure. See operation 2. In response to the LTE Random Access Response 214, a scheduled transmission 216 is sent in the form of a LTE Layer 2/Layer 3 Message (e.g. RRC connection request message). See operation 3. The base station 211-1 then sends (and the wireless device 211-2 receives) a LTE Contention Resolution Message 218. See operation 4.

As mentioned earlier in the context of the method 200 of FIG. 2A, these and/or any additional random access procedures and connection requests may be restricted as result of the failure to receive a threshold number of any of the response messages (e.g. LTE Random Access Response 214, LTE Contention Resolution Message 218, etc.). More information will now be set forth regarding a specific method by which such restriction may be triggered and carried out.

Figure 3:
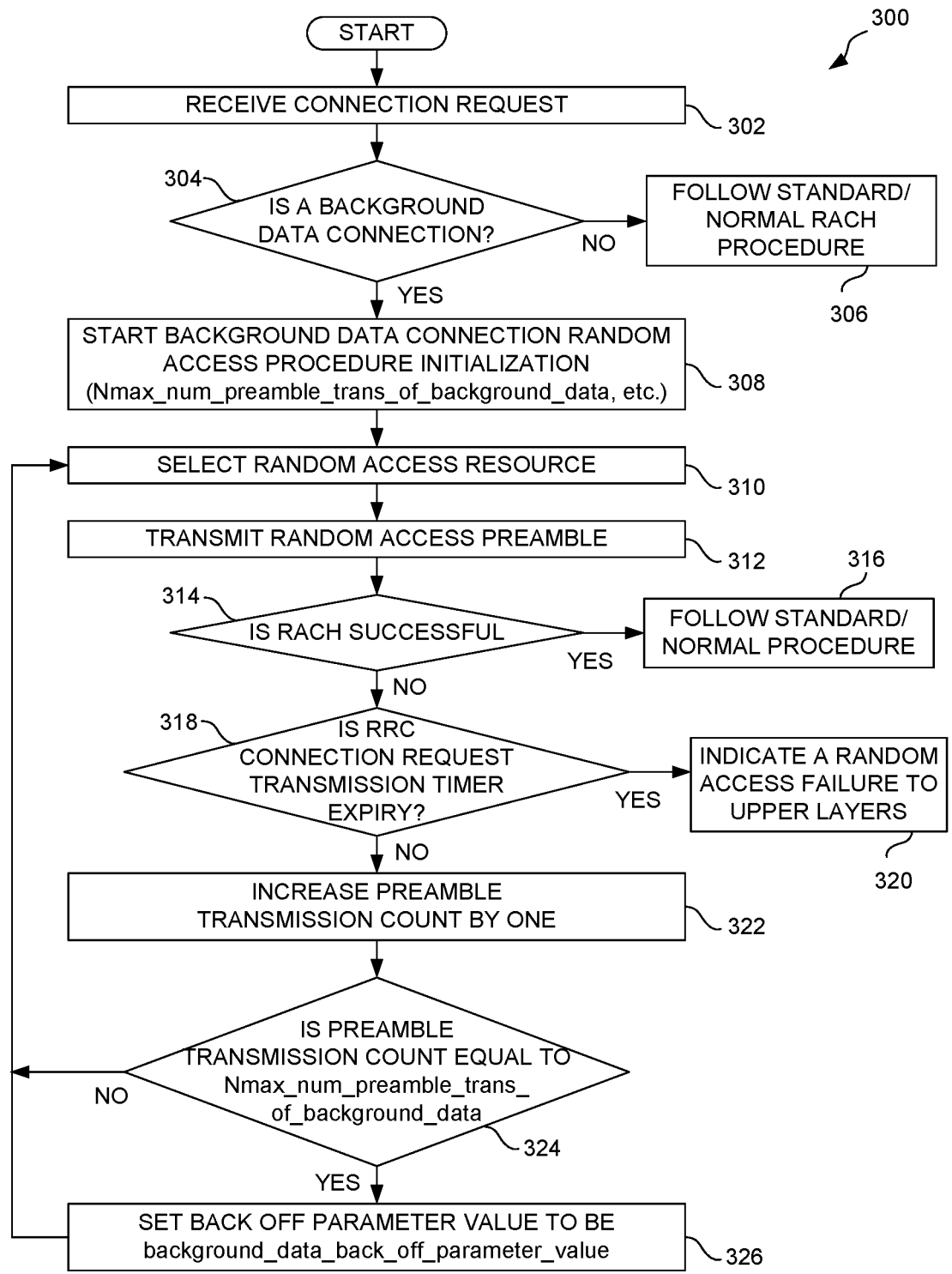
FIG. 3 illustrates a method for restricting a random access procedure that originates from an application running in the background on a wireless communication device, in accordance with an embodiment.

FIG. 3 illustrates a method 300 for restricting a random access procedure in connection with a connection request that originates from an application running a background process on a wireless device, in accordance with an embodiment. As an option, the method 300 may be implemented in the context of any one or more of the embodiments set forth in any previous and/or subsequent figure(s) and/or the description thereof. For example, the method 300 may be carried out by the wireless devices 104A, 104B of FIG. 1 and/or incorporate one or more features of the method 200 of FIG. 2. However, it is to be appreciated that the method 300 may be implemented in other suitable environments.

As shown, a connection request is received in operation 302 after which it is determined whether the connection request is a result of a background data connection per decision 304. If not, the method 300 continues by operation in accordance with standard (e.g. normal) random access procedure (RACH), per operation 306.

On the other hand, if it is determined that the connection request is a result of a background data connection per decision 304, a special background data connection RACH is triggered that begins with the initialization of a threshold number of failed preamble transmissions (e.g. Nmax_num_preamble_trans_of_background_data). See operation 308. As mentioned earlier, such threshold may be dynamically configured by the wireless device and/or base station (or other network componentry), in any desired manner. In terms of configurability, a larger value for such threshold may reduce a frequency of any restrictions on random access procedure (e.g. restriction on transmission of random access preambles), since such threshold is triggered less often. Conversely, a smaller value for such threshold may increase a frequency of any restrictions on the random access procedure (e.g. restriction on transmission of random access preambles) in connection with the background process-related connection request. For connection requests originating from an application running in the background, the maximum number of failed preamble transmissions may thus be configured to be smaller than a normal/common threshold value used/received from a base station. A smaller value for such threshold may also reduce a maximum transmit power of the random access preamble of the wireless communication device which, in turn, may reduce radio interference on the network.

With continuing reference to FIG. 3, a random access resource is selected per operation 310. In one embodiment, a random access resource selection procedure may be performed in accordance with that defined by the 3GPP standard, for use in transmitting a random access preamble (which is a first/initial message in the RACH), as indicated in operation 312. As mentioned previously, such preamble may be randomly selected from a predetermined range of preamble values.

It is then determined whether the RACH was successful per decision 314. Specifically, it is determined whether required connection-related responses (e.g. response 214, 218 of FIG. 2) have been received within a predetermined timeframe (as dictated by timer values broadcasted by a base station). If so, it may be assumed that the RACH procedure is proceeding properly and there is no reason to continue with the special background data connection RACH. See operation 316.

However, if it is determined that the RACH was not successful per decision 314, it is additionally determined whether a transmission of RRC connection request timer has expired per decision 318. In use, such timer stops upon achieving a successful RACH (i.e. upon receiving a response to the RRC connection request). Before such timer has expired, the method 300 proceeds to operation 322 in an attempt to achieve a successful RACH. If a successful RACH is not achieved by the expiration of the timer per decision 318, the method 300 indicates a RACH failure to upper layers in operation 320.

With that said, if a successful RACH is not achieved but the timer has not expired per decision 318, the method 300 continues by incrementing a preamble transmission counter by one in operation 322, since there is one preamble transmission per each random access procedure. Next, it is determined in decision 324 whether a current value of the preamble transmission counter is greater than the corresponding threshold initialized in operation 308 (e.g. Nmax_num_preamble_trans_of_background_data). If not, another RACH may be initiated in operation 310.

However, if it is determined in decision 324 that the preamble transmission counter is indeed equal to the corresponding threshold, a restriction of the background process-related connection requests is initiated in operation 326. Specifically, in the present embodiment, a back off parameter value may be set to be a predetermined value (e.g. background_data_back_off_parameter). As mentioned earlier, a value of such back off parameter may be raised, in order to lower a priority with which the background process-related connection requests are managed.

In various embodiments, such increased back off parameter value (that is larger than a current normal one which is used for connection requests originating from any and all applications) may be statically (e.g. predetermined) or dynamically configured by the wireless device and/or base station (or other network componentry), in any desired manner. In terms of configurability, a larger value for such back off parameter reduces the frequency of random access request/preamble transmission for background process-related connection requests, since a larger back off parameter triggers random access preamble transmission less often. This may, in turn, reduce collisions during a random access procedure in connection with foreground process-related connection requests.

The foregoing back off parameter may be implemented in various ways in accordance with different embodiments. For example, in one possible embodiment, a back off parameter may be used which is defined in accordance with a predetermined communication protocol (e.g. LTE, LTE-A, and/or an advanced permutation thereof, etc.). As mentioned earlier, such back off parameter may, in the absence of any congestion (per the previous operations), be randomly generated for the corresponding wireless device, so that there is a random distribution of priorities amongst devices. However, in operation 326, such back off parameter may be proactively increased in order to de-prioritize background process-related connection requests. In various aspects of the present embodiment, such increase may involve setting the back off parameter above a predetermined threshold value, or randomly select a back off parameter from a range of values that are all above a threshold value.

In still other embodiments, the aforementioned increase in back off parameter value may be implemented using different back off parameters that may be used for different situations. For example, a particular back off parameter may be used for normal operation (and in connection with all foreground/background applications), while a separate, special back off parameter (with a higher value) may be used for implementing operation 326. In any of the previous embodiments, and strictly as an option, the adjusted value of such back off parameter (as well as the aforementioned threshold value) may be reverted to a previous value after operation 326, and/or in the event of network congestion returns to normal levels (i.e. decisions 314, 318 are not/no longer triggered, etc.).

Figure 4:
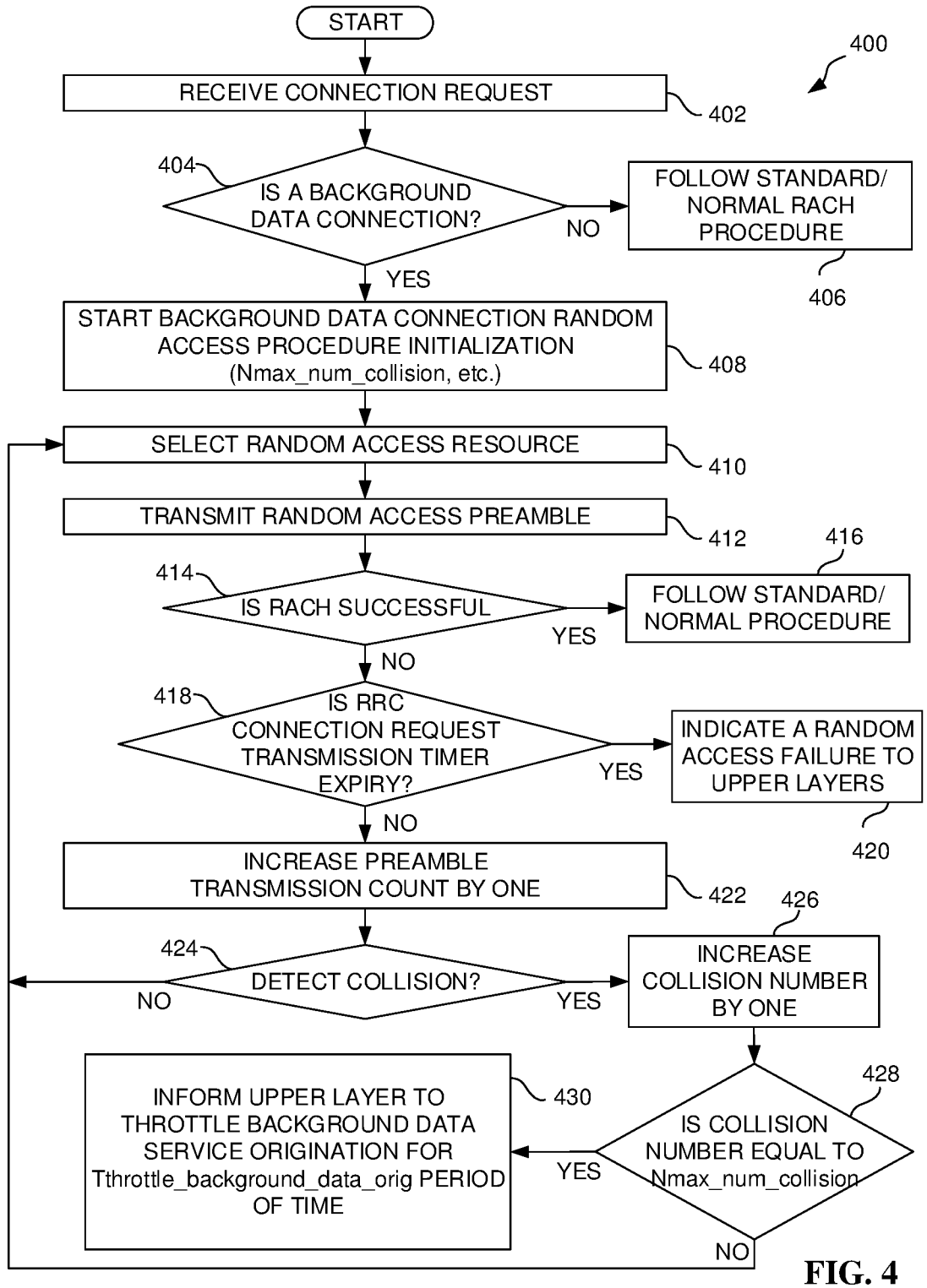
FIG. 4 illustrates a method for restricting a random access procedure that originates from an application running in the background on a wireless communication device, in accordance with another embodiment.

FIG. 4 illustrates a method 400 for restricting the transmission of a random access preamble in connection with a connection request that originates from an application running in background process on a wireless device, in accordance with another embodiment. In one embodiment, this may be accomplished by restricting one or more connection requests that originate from an application running on a wireless device when the device detects cell congestion. As an option, the method 400 may be implemented in the context of any one or more of the embodiments set forth in any previous and/or subsequent figure(s) and/or the description thereof. For example, the method 400 may be carried out by the wireless devices 104A, 104B of FIG. 1 and/or incorporate one or more features of the method 200 of FIG. 2. However, it is to be appreciated that the method 400 may be implemented in other suitable environments.

Similar to the embodiment described in connection with the previous figure, a connection request is received in operation 402 after which it is determined whether the connection request is a result of a background data connection per decision 404. If not, the method 400 continues by operation in accordance with a standard (e.g. normal) RACH, per operation 406. On the other hand, if it is determined that the connection request is a result of a background data connection per decision 404, a special background data connection RACH is triggered that begins with the initialization of a threshold number of collisions (e.g. Nmax_num_collision). See operation 408.

As mentioned earlier, such threshold may be statically (e.g. predetermined) or dynamically configured by the wireless device and/or base station (or other network componentry), in any desired manner. In terms of configurability, a larger value for such threshold may reduce a frequency of any restrictions on background process-related connection requests which, in turn, may reduce a frequency of any restrictions on transmissions of random access preambles since such threshold is triggered less often. Conversely, a smaller value for such threshold may increase a frequency of any restrictions on background process-related connection requests. This, in turn, may increase a frequency of any restrictions on transmissions of a random access preamble.

With continuing reference to FIG. 4, a random access resource is selected per operation 410. As mentioned earlier, the random access resource selection procedure may be performed in accordance with that defined in the 3GPP standard, for use in transmitting a random access preamble (which is a first/initial message in the RACH), as indicated in operation 412.

It is then determined whether the RACH was successful per decision 414. Specifically, it is determined whether required connection-related responses (e.g. response 214, 218 of FIG. 2) have been received within a predetermined timeframe (as dictated by timer values broadcasted by a base station). If so, it may be assumed that the RACH procedure is proceeding properly and there is no reason to continue with the special background data connection RACH. See operation 416.

However, if it is determined that the RACH was not successful per decision 414, it is additionally determined whether a transmission of RRC connection request timer has expired per decision 418. In use, such timer stops upon achieving a successful RACH (i.e. upon receiving a response to the RRC connection request). If a successful RACH is not achieved by the expiration of the timer per decision 318, the method 400 indicates a RACH failure to upper layers in operation 320.

With that said, if a successful RACH is not achieved but the timer has not expired per decision 418, the method 400 continues by incrementing a preamble transmission counter by one in operation 422, since there is one preamble transmission per each random access procedure. Next, it is determined in decision 424 whether a collision has been detected. Specifically, it is determined whether one or more connection-related responses (e.g. response 214, 218 of FIG. 2) has not been received within a predetermined timeframe. If so, the method 400 continues by incrementing a collision counter by one in operation 426. To this end, it may be determined in decision 428, whether a current value of the collision counter is greater than the corresponding threshold initialized in operation 408 (e.g. Nmax_num_collision). If not, another RACH may be initiated in operation 410.

However, if it is determined in decision 428 that the collision counter is indeed equal to the corresponding threshold, a restriction of the background process-related connection requests is initiated in operation 430. As mentioned earlier, such timer may dictate a duration of time before which a wireless device may attempt to access the corresponding base station again by initiating a connection request (see, again, operation 402). Specifically, the timer may be augmented so as to restrict background process-related connection requests so that they may not occur for the period of time (i.e. before the new timer expires). It should be noted that, in various embodiments when the wireless device detects that it is has traveled out of a congested cell area, the device may cancel the timer, and reset the collision number count.

By this design, the method 400 of FIG. 4 differs from the method 300 of FIG. 3, by virtue of the trigger that is used to initiate the special background data connection RACH (e.g.

collision vs. preamble failure, etc.), as well as the specific technique used to restrict background process-related connection requests (e.g. timer vs. back off parameter, etc.).

Figure 5:
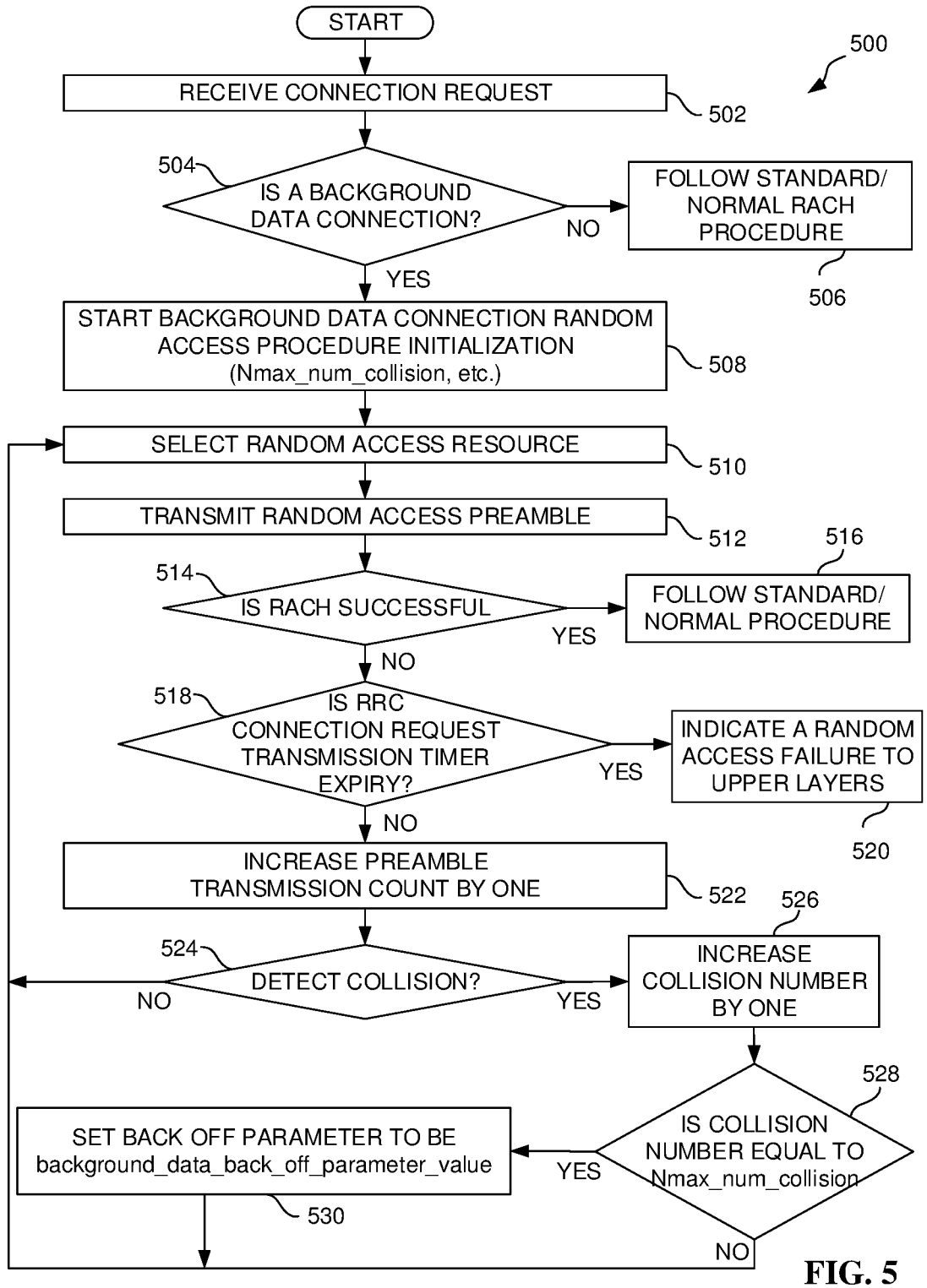
FIG. 5 illustrates a method for restricting a random access procedure that originates from an application running in the background on a wireless communication device, in accordance with another embodiment.

FIG. 5 illustrates a method 500 for restricting a random access procedure in connection with a connection request that originates from an application running a background process on a wireless device, in accordance with another embodiment. As an option, the method 500 may be implemented in the context of any one or more of the embodiments set forth in any previous and/or subsequent figure(s) and/or the description thereof. For example, the method 500 may be carried out by the wireless devices 104A, 104B of FIG. 1 and/or incorporate one or more features of the method 200 of FIG. 2. However, it is to be appreciated that the method 500 may be implemented in other suitable environments.

Similar to the embodiments described in connection with the previous two figures, a connection request is received in operation 502 after which it is determined whether the connection request is a result of a background data connection per decision 504. If not, the method 500 continues by operation in accordance with standard (e.g. normal) RACH, per operation 506. On the other hand, if it is determined that the connection request is a result of a background data connection per decision 504, a special background data connection RACH is triggered that begins with the initialization of a threshold number of collisions (e.g. Nmax_num_collision). See operation 508.

As mentioned earlier, such threshold may be statically (e.g. predetermined) or dynamically configured by the wireless device and/or base station (or other network componentry), in any desired manner. In terms of configurability, a larger value for such threshold may reduce a frequency of any restrictions on background process-related connection requests, which, in turn, may reduce a frequency of any restrictions on transmissions of random access preambles since the threshold is triggered less often. Conversely, a smaller value for such threshold may increase a frequency of any restrictions on background process-related connection requests. This, in turn, may increase a frequency of any restrictions on transmissions of a random access preamble.

With continuing reference to FIG. 5, a random access resource is selected per operation 510. As mentioned earlier, a random access resource selection procedure may be performed in accordance with that defined by the 3GPP standard, for use in transmitting a random access preamble (which is a first/initial message in the RACH), as indicated in operation 512.

It is then determined whether the RACH was successful per decision 514. Specifically, it is determined whether connection-related responses (e.g. response 214, 218 of FIG. 2) have been received within a predetermined timeframe (as dictated by timer values broadcasted by a base station). If so, it may be assumed that the RACH procedure is proceeding properly and there is no reason to continue with the special background data connection RACH. See operation 516.

However, if it is determined that the RACH was not successful per decision 514, it is additionally determined whether a transmission of RRC connection request timer has expired per decision 518. In use, such timer stops upon achieving a successful RACH (i.e. upon receiving a response to the RRC connection request). Before such timer has expired, the method 500 proceeds to operation 522 in an attempt to achieve a successful RACH. If a successful RACH is not achieved by the expiration of the timer per decision 518, the method 500 indicates a RACH failure to upper layers in operation 520.

With that said, if a successful RACH is not achieved but the timer has not expired per decision 518, the method 500 continues by incrementing a preamble transmission counter by one in operation 522, since there is one preamble transmission per each random access procedure. Next, it is determined in decision 524 whether a collision has been detected. Specifically, it is determined whether one or more connection-related responses (e.g. response 214, 218 of FIG. 2) has not been received within a predetermined timeframe. If so, the method 500 continues by incrementing a collision counter by one in operation 526. To this end, it may be determined in decision 528, whether a current value of the collision counter is greater than the corresponding threshold initialized in operation 508 (e.g. Nmax_num_collision). If not, another RACH may be initiated in operation 510.

However, if it is determined in decision 528 that the collision counter is indeed equal to the corresponding threshold, a restriction of the background process-related connection requests is initiated in operation 530. Specifically, in the present embodiment, a back off parameter value may be set to be a predetermined value (e.g. background_data_back_off_parameter). As mentioned earlier, a value of such back off parameter may be raised, in order to lower a priority with which the background process-related connection requests are managed.

In various embodiments, such increased back off parameter value (that is larger than a current normal one which is used for connection requests originating from any and all applications) may be statically (e.g. predetermined) or dynamically configured by the wireless device and/or base station (or other network componentry), in any desired manner. In terms of configurability, a larger value for such back off parameter reduces the frequency of random access request/preamble transmission for background process-related connection requests, since a larger back off parameter triggers random access preamble transmission less often. This may, in turn, reduce collisions during a random access procedure in connection with foreground process-related connection requests.

By this design, the method 500 of FIG. 5 differs from the method 300 of FIG. 3, by virtue of the trigger that is used to initiate the special background data connection RACH (e.g. collision vs. preamble failure, etc.), but uses a similar technique to restrict background process-related connection. Thus, various embodiments are described that may possibly improve a user-requested connection access attempt success rate and connection establishment speed, by restricting a wireless device making background data connection requests, thereby slowing down random access transmission attempts during certain conditions. This, in turn, may be particularly beneficial in cases of excessive demand. To this end, a better mobile communication device user experience may be provided in some embodiments.

Figure 6:
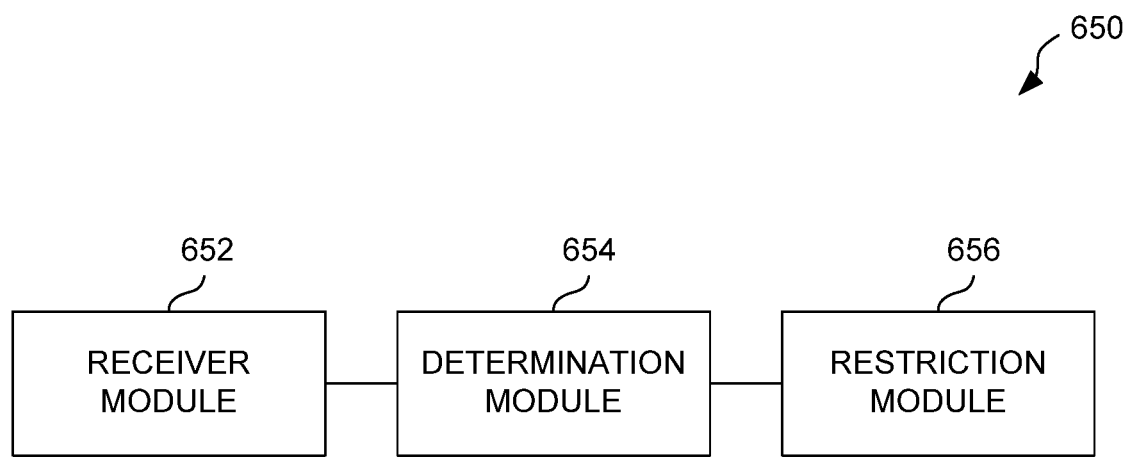
FIG. 6 illustrates a system for restricting a random access procedure that originates from an application running in the background on a wireless communication device, in accordance with an embodiment.

FIG. 6 illustrates a system 650 for restricting transmission of random access preamble and transmission of one or more connection requests that originate from an application running on a wireless device, in accordance with an embodiment. As an option, the system 650 may be implemented with one or more features of any one or more of the embodiments set forth in any previous and/or subsequent figure(s) and/or the description thereof. However, it is to be appreciated that the system 650 may be implemented in other suitable environments.

As shown, a receiver means in the form of a receiver module 652 is provided for receiving a connection request from an application running as a background process on a wireless communication device. In various embodiments, the receiver module 652 may include, but is not limited to a component of the wireless device 104A of FIG. 1, at least one processor or component thereof (to be described later) and any software controlling the same, and/or any other circuitry capable of the aforementioned functionality.

Also included is a determination means in the form of a determination module 654 in communication with the receiver module 652 for determining whether one or more random access procedure criteria of a random access procedure is met. In various embodiments, the determination module 654 may include, but is not limited to a component of the wireless device 104A of FIG. 1, at least one processor or component thereof (to be described later) and any software controlling the same, and/or any other circuitry capable of the aforementioned functionality.

With continuing reference to FIG. 6, restriction means in the form of a restriction module 656 is in communication with the determination module 654 for restricting at least one aspect of the random access procedure in connection with performing the random access procedure, in response to the determination that the one or more random access procedure criteria is met. In various embodiments, the restriction module 656 may include, but is not limited to a component of the wireless device 104A of FIG. 1, at least one processor or component thereof (to be described later) and any software controlling the same, and/or any other circuitry capable of the aforementioned functionality.

Figure 7:
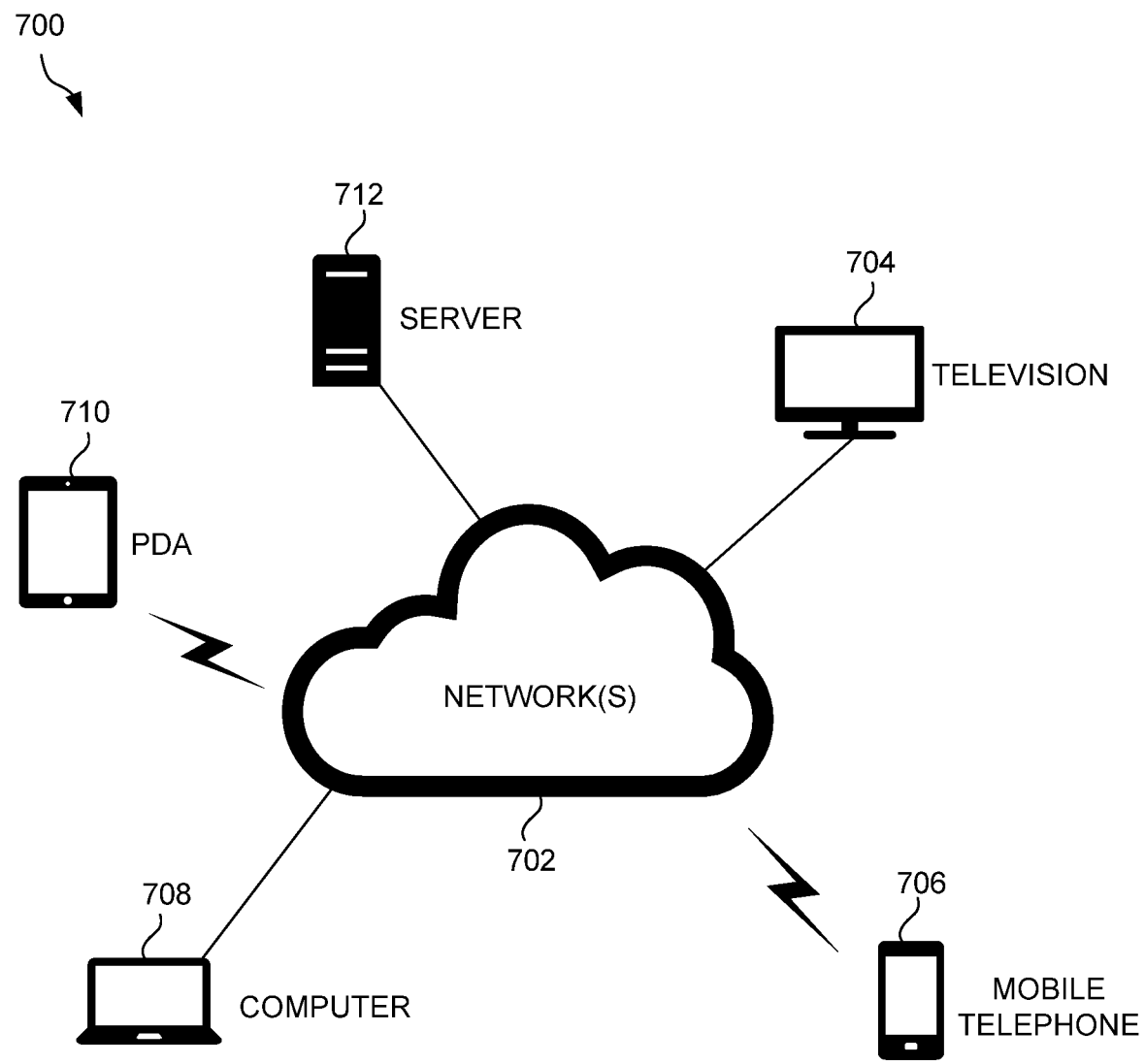
FIG. 7 is a diagram of a network architecture, in accordance with an embodiment.

FIG. 7 is a diagram of a network architecture 700, in accordance with an embodiment. As shown, at least one network 702 is provided. In various embodiments, any one or more components/features set forth during the description of any previous figure(s) may be implemented in connection with any one or more of the components of the at least one network 702 which, in one embodiment, may include the network 108 of FIG. 1.

In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server 712 and a computer 708 may be coupled to the network 702 for communication purposes. Such computer 708 may include a desktop computer, lap-top computer, and/or any other type of logic. Still yet, various other devices may be coupled to the network 702 including a personal digital assistant (PDA) device 710, a mobile phone device 706, a television 704, etc.

Figure 8:
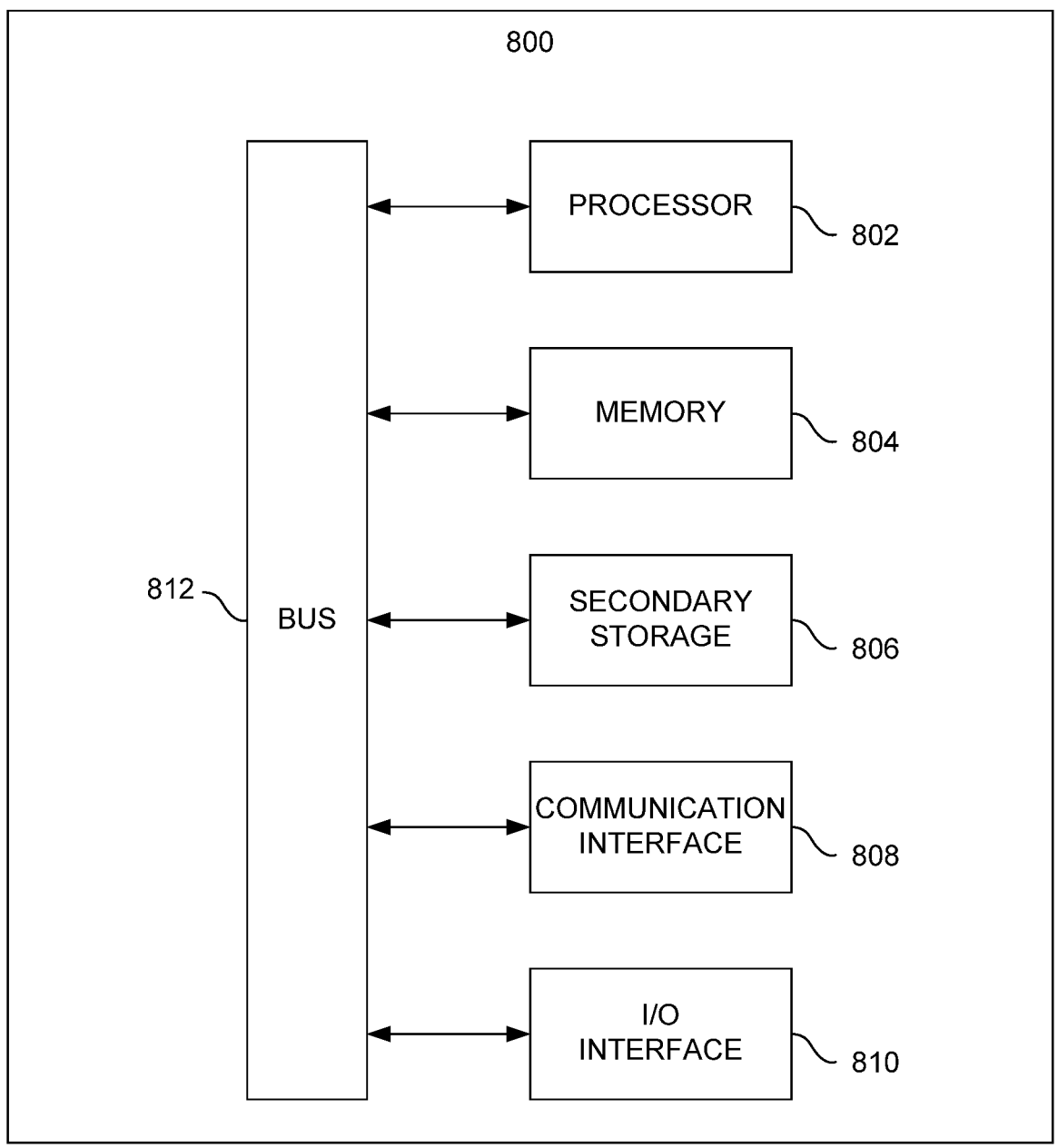
FIG. 8 is a diagram of an exemplary processing device, in accordance with an embodiment.

FIG. 8 is a diagram of an exemplary processing device 800, in accordance with an embodiment. As an option, the processing device 800 may be implemented in the context of any of the devices of the network architecture 700 of FIG. 7, and the wireless devices 104A, 104B of FIG. 1. However, it is to be appreciated that the processing device 800 may be implemented in any desired environment.

As shown, the processing device 800 includes at least one processor 802 which is connected to a bus 812. The processing device 800 also includes memory 804 [e.g., hard disk drive, solid state drive, random access memory (RAM), etc.] coupled to the bus 812. The memory 804 may include one or more memory components, and may even include different types of memory. Further included is a communication interface 808 (e.g. local/remote network interface, memory access interface, etc.) and an input/output (I/O) interface 810 (e.g. display, speaker, microphone, touchscreen, touchpad, mouse interface, etc.).

The processing device 800 may also include a secondary storage 806. The secondary storage 806 coupled to the bus 812 and/or to other components of the processing device 800. The secondary storage 806 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 804, the secondary storage 806, and/or any other memory, for that matter. Such computer programs, when executed, enable the processing device 800 to perform various functions (as set forth above, for example). Memory 804, secondary storage 806 and/or any other storage comprise non-transitory computer-readable media.

In one embodiment, the at least one processor 802 executes instructions in the memory 804 or in the secondary storage 806 to receive a connection request from an application running as a background process on the wireless communication device, and determine whether one or more random access procedure criteria of a random access procedure is met. The random access procedure establishes a communication connection of the wireless communication device for the connection request. In response to the determination that the one or more random access procedure criteria is met, at least one aspect of the random access procedure is restricted, utilizing one or more processors. Further, the random access procedure is performed with the restricted at least one aspect to establish the communication connection for the connection request.

Optionally, in any of the preceding embodiments, the one or more random access procedure criteria may involve a failed random access preamble transmission threshold number, and the determination as to whether the one or more random access procedure criteria is met may include comparing a number of failed random access preamble transmissions to the failed random access preamble transmission threshold number.

Optionally, in any of the preceding embodiments, the one or more random access procedure criteria may involve a random access procedure message collision threshold number, and the determination as to whether the one or more random access procedure criteria is met may include comparing a number of random access procedure message collisions to the random access procedure message collision threshold number.

Optionally, in any of the preceding embodiments, the restricted at least one aspect of the random access procedure that is restricted may include a transmission of one or more random access attempt requests. As an option, the restricted at least one aspect of the random access procedure that is restricted may include a time between the transmission of a plurality of the random access attempt requests. As another option, the restricted at least one aspect of the random access procedure that is restricted may include a number of the random access attempt requests that are transmitted.

Optionally, in any of the preceding embodiments, the restricted at least one aspect of the random access procedure that is restricted may include one or more subsequent connection requests. As a further option, the restricted at least one aspect of the random access procedure may be restricted by throttling the one or more subsequent connection requests.

Optionally, in any of the preceding embodiments, the restricted at least one aspect of the random access procedure may be restricted by increasing a back off parameter value.

Optionally, in any of the preceding embodiments, the restricted at least one aspect of the random access procedure may be restricted utilizing a timer that restricts the restricted at least one aspect of the random access procedure.

Optionally, in any of the preceding embodiments, the restricted at least one aspect of the random access procedure may be restricted by the wireless communication device, by the one or more random access procedure criteria being configured by the wireless communication device.

Optionally, in any of the preceding embodiments, the restricted at least one aspect of the random access procedure may be restricted by a network, by the one or more random access procedure criteria being received at the wireless communication device from a base station of the network.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method, comprising:
receiving a connection request from an application;
determining whether the connection request is generated in response to the application running as a background process or a foreground process on a wireless communication device, wherein the background process is a process configured to be carried out by the wireless communication device without a real-time user interaction with the application, whereas the foreground process is a process configured to be implemented in accordance with a real-time user interaction with the application;
in response to a determination that the connection request is generated responsive to the application running as the background process on the wireless communication device:
determining whether one or more random access procedure criteria of a random access procedure is met, the random access procedure to establish a communication connection of the wireless communication device for the connection request;
in response to a determination that the one or more random access procedure criteria is met, restricting, utilizing one or more processors, at least one aspect of the random access procedure; and
performing the random access procedure with a restriction of the at least one aspect to establish the communication connection for the connection request.

2. The method of claim 1, wherein the one or more random access procedure criteria involves a failed random access preamble transmission threshold number, and the determination as to whether the one or more random access procedure criteria is met includes comparing a number of failed random access preamble transmissions to the failed random access preamble transmission threshold number.

3. The method of claim 1, wherein the one or more random access procedure criteria involves a random access procedure message collision threshold number, and the determination as to whether the one or more random access procedure criteria is met includes comparing a number of random access procedure message collisions to the random access procedure message collision threshold number.

4. The method of claim 1, wherein the at least one aspect of the random access procedure that is restricted includes a transmission of one or more random access attempt requests.

5. The method of claim 4, wherein the at least one aspect of the random access procedure that is restricted includes a time between the transmission of a plurality of the random access attempt requests.

6. The method of claim 4, wherein the at least one aspect of the random access procedure that is restricted includes a number of the random access attempt requests that are transmitted.

7. The method of claim 1, wherein the at least one aspect of the random access procedure that is restricted includes one or more subsequent connection requests.

8. The method of claim 7, wherein the at least one aspect of the random access procedure is restricted by throttling the one or more subsequent connection requests.

9. The method of claim 1, wherein the at least one aspect of the random access procedure is restricted by increasing a back off parameter value.

10. The method of claim 1, wherein the at least one aspect of the random access procedure is restricted utilizing a timer that restricts the at least one aspect of the random access procedure.

11. The method of claim 1, wherein the at least one aspect of the random access procedure is restricted by the wireless communication device, by the one or more random access procedure criteria being configured by the wireless communication device.

12. The method of claim 1, wherein the at least one aspect of the random access procedure is restricted by a network, by the one or more random access procedure criteria being received at the wireless communication device from a base station of the network.

13. A processing device, comprising:
a non-transitory memory storing instructions; and
one or more processors in communication with the non-transitory memory, wherein the one or more processors execute the instructions to:
receive a connection request from an application;
determining whether the connection request is generated in response to the application running as a background process or a foreground process on a wireless communication device, wherein the background process is a process configured to be carried out by the wireless communication device without a real-time user interaction with the application, whereas the foreground process is a process configured to be implemented in accordance with a real-time user interaction with the application;
in response to a determination that the connection request is generated in response to the application running as the background process on the wireless communication device:
determine whether one or more random access procedure criteria of a random access procedure is met, the random access procedure to establish a communication connection of the wireless communication device for the connection request;
in response to the determination that the one or more random access procedure criteria is met, restrict at least one aspect of the random access procedure; and perform the random access procedure with a restriction of the at least one aspect to establish the communication connection for the connection request.

14. The processing device of claim 13, wherein the one or more random access procedure criteria involves a failed random access preamble transmission threshold number, and the determination as to whether the one or more random access procedure criteria is met includes comparing a number of failed random access preamble transmissions to the failed random access preamble transmission threshold number.

15. The processing device of claim 13, wherein the one or more random access procedure criteria involves a random access procedure message collision threshold number, and the determination as to whether the one or more random access procedure criteria is met includes comparing a number of random access procedure message collisions to the random access procedure message collision threshold number.

16. The processing device of claim 13, wherein the at least one aspect of the random access procedure that is restricted includes a transmission of one or more random access attempt requests.

17. The processing device of claim 16, wherein the at least one aspect of the random access procedure that is restricted includes a time between the transmission of a plurality of the random access attempt requests.

18. The processing device of claim 16, wherein the at least one aspect of the random access procedure that is restricted includes a number of the random access attempt requests that are transmitted.

19. The processing device of claim 13, wherein the at least one aspect of the random access procedure that is restricted includes one or more subsequent connection requests.

20. The processing device of claim 19, wherein the at least one aspect of the random access procedure is restricted by throttling the one or more subsequent connection requests.

21. The processing device of claim 13, wherein the at least one aspect of the random access procedure is restricted by increasing a back off parameter value.

22. The processing device of claim 13, wherein the at least one aspect of the random access procedure is restricted utilizing a timer that restricts the at least one aspect of the random access procedure.

23. The processing device of claim 13, wherein the at least one aspect of the random access procedure is restricted by the wireless communication device, by the one or more random access procedure criteria being configured by the wireless communication device.

24. The processing device of claim 13, wherein the at least one aspect of the random access procedure is restricted by a network, by the one or more random access procedure criteria being received at the wireless communication device from a base station of the network.

25. A computer program product comprising computer executable instructions stored on a non-transitory computer readable medium that when executed by a processor instruct the processor to:
   receive a connection request from an application;
   determine whether the connection request is generated in response to the application running as a background process or a foreground process on a wireless communication device, wherein the background process is a process configured to be carried out by the wireless communication device without a real-time user interaction with the application, whereas the foreground process is a process configured to be implemented in accordance with a real-time user interaction with the application;
   in response to a determination that the connection request is generated in response to the application running as the background process on the wireless communication device:
      determine whether one or more random access procedure criteria of a random access procedure is met, the random access procedure to establish a communication connection of the wireless communication device for the connection request;
      in response to the determination that the one or more random access procedure criteria is met, restrict at least one aspect of the random access procedure; and
      perform the random access procedure with a restriction of the at least one aspect to establish the communication connection for the connection request.

* * * * *